(12) United States Patent
Nakaganna et al.

(10) Patent No.: US 9,885,279 B2
(45) Date of Patent: Feb. 6, 2018

(54) PORTABLE WORKING MACHINE

(71) Applicant: YAMABIKO CORPORATION, Tokyo (JP)

(72) Inventors: Hiroshi Nakaganna, Hiroshima (JP); Buhei Kobayashi, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 235 days.

(21) Appl. No.: 15/049,928

(22) Filed: Feb. 22, 2016

(65) Prior Publication Data

US 2016/0258351 A1   Sep. 8, 2016

(30) Foreign Application Priority Data

Mar. 2, 2015 (JP) ................... 2015-040599

(51) Int. Cl.
| F02B 63/02 | (2006.01) |
| B23D 45/16 | (2006.01) |
| B23D 59/00 | (2006.01) |
| B23Q 11/00 | (2006.01) |

(52) U.S. Cl.
CPC .............. *F02B 63/02* (2013.01); *B23D 45/16* (2013.01); *B23D 59/006* (2013.01); *B23Q 11/006* (2013.01)

(58) Field of Classification Search
CPC ...... F02B 63/02; B23Q 11/006; B23D 59/006
See application file for complete search history.

(56) References Cited

U.S. PATENT DOCUMENTS

| 6,681,726 B2 * | 1/2004 | Linsbauer ................ F01P 11/12 |
| | | 123/198 E |
| 6,991,664 B2 * | 1/2006 | Riehmann ............ F02M 35/022 |
| | | 123/198 E |
| 9,068,504 B2 * | 6/2015 | Nishikawa .............. F02B 63/02 |
| 2002/0189212 A1 | 12/2002 | Hettmann |
| 2002/0189560 A1 | 12/2002 | Linsbauer et al. |

FOREIGN PATENT DOCUMENTS

| CA | 847677 A | 7/1970 |
| JP | 2007-046586 A | 2/2007 |
| WO | WO 2012/090480 A2 | 7/2012 |
| WO | WO 2014/140052 A1 | 9/2014 |

OTHER PUBLICATIONS

European Patent Office, Extended European Search report for Application No. 16158121.0, dated Jul. 11, 2016, 5 pages, Germany.

* cited by examiner

*Primary Examiner* — Kevin A Lathers
(74) *Attorney, Agent, or Firm* — Alston & Bird LLP

(57) ABSTRACT

A cyclone separator having a circular cross section is arranged upstream of an air filter. An introduction passage extends from a branch air inlet, which is provided at a position displaced from a main passage, to the cyclone separator. A margin space where at least part of air introduced in the introduction passage flows is formed in the introduction passage before the cyclone separator. A swirl flow occurring in the cyclone separator starts at this margin space.

12 Claims, 15 Drawing Sheets

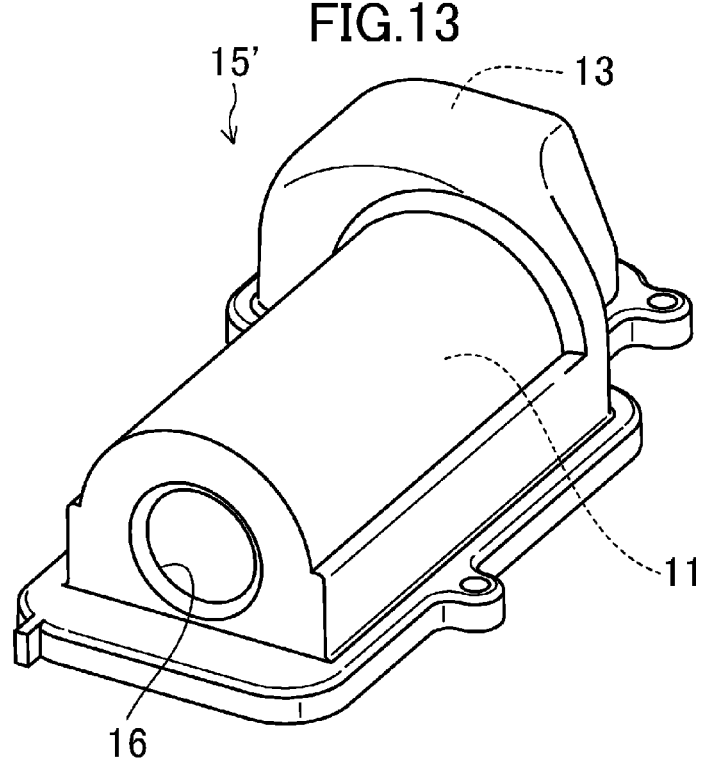
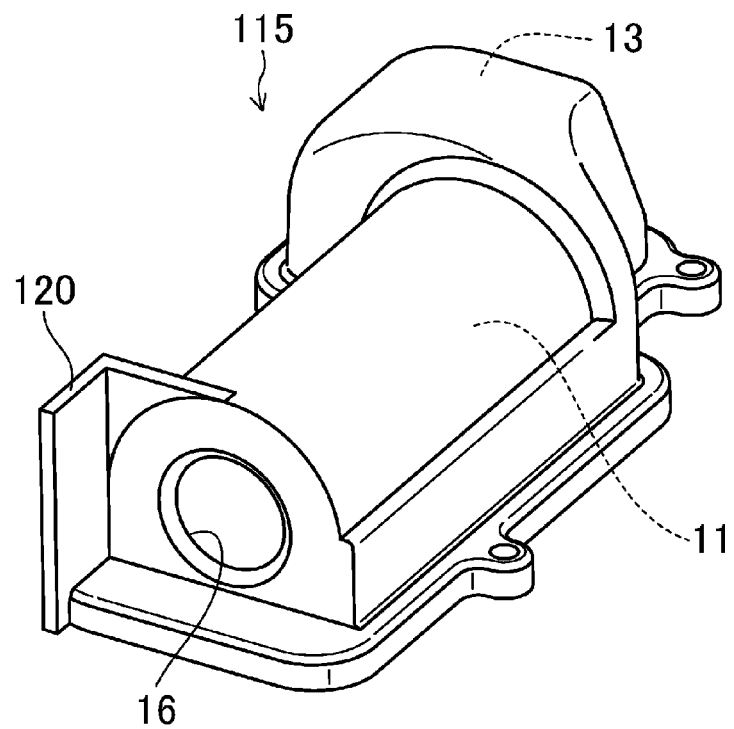

PORTABLE WORKING MACHINE

CROSS-REFERENCE TO RELATED APPLICATIONS

This application claims priority to and the benefit of Japanese Patent Application No. 2015-040599 filed on Mar. 2, 2015, the contents of which as are hereby incorporated by reference in their entirety.

BACKGROUND

Technical Field

The present invention relates to a portable working machine provided with an engine as a power source.

Related Field

Portable working machines, which are called cut-off saws or engine cutters have been known as tools for cutting a concrete mass, for example. As the engine cutter is repeatedly used to cut materials, such as concrete in particular, which generate dust particles, the air cleaner for the engine of the engine cutter becomes clogged. This clogging may reduce the output of the engine and the workability. Further, entry of the dust particles into the inside of the engine may cause a failure of the engine.

For example, Japanese Unexamined Patent Publication No. 2007-46586 discloses a portable working machine which includes a fan configured to be rotated by an engine, a first volute surrounding the fan, and a second volute provided inside or outside the first volute. The fan of this portable working machine has, on one of its front and back faces, first fins which are associated with the first volute. The fan further has, on the other face, second fins which are associated with the second volute. The first volute is capable of ejecting air which has been sucked by the first fins and which serves as cooling air for the engine. A region near the inner periphery of the second volute communicates with an intake air passage of the engine, and a region near the outer periphery opens in the surrounding area of the engine. A cyclone-type centrifugal portion is provided downstream of the second volute at an intermediate portion of the intake air passage. In this portable working machine, a first-stage centrifugation is performed in the second volute and a second-stage centrifugation is performed in the downstream centrifugal portion. This configuration allows for better purification of air to be supplied to the engine and significant reduction of the load on the air cleaner.

BRIEF SUMMARY

It is however impossible to remove dust particles sufficiently only by the two-stage separation of dust particles as disclosed in Japanese Unexamined Patent Publication No. 2007-46586. Even with this two-stage separation, it is still necessary to replace the filter of the air cleaner frequently.

In view of the foregoing, it is therefore an object of the present invention to increase the durability of an engine by separating dust particles sufficiently with as few components as possible, and to extend the maintenance cycle of an air filter.

To achieve the object, the working machine of the present invention is configured to enable effective separation of dust particles in a passage extending from a centrifugal fan toward an air filter.

Specifically, a portable working machine of the present invention is provided with an engine as a power source. The portable working machine includes:

a centrifugal fan which is driven by the engine and which sucks and transfers air;

a main passage which is provided in a housing space where the centrifugal fan is housed, and through which a cooling airflow containing dust particles that have been pressed, by the centrifugal fan, against an inner peripheral surface of a wall defining the housing space is transferred;

a branch air inlet which is provided at a position displaced from the main passage, and through which air containing less dust particles than the airflow passing through the main passage is transferred toward an air filter;

a cyclone separator which is provided upstream of the air filter and has a circular cross section; and an introduction passage which extends from the branch air inlet to the cyclone separator.

Further, a margin space where at least part of the air introduced in the introduction passage flows is formed in the introduction passage before the cyclone separator, and the working machine is configured such that a swirl flow occurring in the cyclone separator starts at the margin space.

With this configuration, when air from which dust particles have been reduced by the action of the centrifugal fan flows into the cyclone separator, a swirl flow to occur later in the cyclone separator starts at the margin space provided before the cyclone separator. Therefore, the swirl flow in the cyclone separator occurs earlier than a swirl flow occurring in a case where no margin space is provided. Further, air smoothly swirls in the cyclone separator thereafter. As can be seen from the foregoing, since the margin space serves as an approach run space for the swirl flow, the swirl flow makes an appropriate number of turns within a short distance. In this manner, effective separation of dust particles is achieved in the cyclone separator.

Here, the margin space may be provided in a passage extending from the introduction passage to the cyclone separator, and formed by making an associated portion of a wall defining the passage protrude opposite to an inlet of the cyclone separator in an axial direction of the cyclone separator.

With this configuration, the swirl flow starts at an appropriate point, and dust particles are effectively separated in the cyclone separator.

A portable working machine provided with an engine as a power source includes:

a centrifugal fan which is driven by the engine and which sucks and transfers air;

a main passage which is provided in a housing space where the centrifugal fan is housed, and through which a cooling airflow containing dust particles that have been pressed, by the centrifugal fan, against an inner peripheral surface of a wall defining the housing space is transferred;

a branch air inlet which is provided at a position displaced from the main passage, and through which air containing less dust particles than the airflow passing through the main passage is transferred toward an air filter;

a cyclone separator which is provided upstream of the air filter and has a circular cross section; and an introduction passage which extends from the branch air inlet to the cyclone separator.

Further, the introduction passage has a straight portion which extends in a tangential direction of the cyclone separator as viewed in an axial direction of the cyclone separator and which continues to the cyclone separator, and a curved portion which extends in an arc and continues to the straight portion.

By transferring air into the cyclone separator in the tangential direction of the cyclone separator, a swirl flow is generated in the cyclone separator. However, according to the conventional manner in which air is transferred simply in the tangential direction, if an inlet passage which is connected to the cyclone separator is designed to have an excessively large size, the swirl flow will be adversely hindered. On the other hand, according to the above configuration, air from which dust particles have been reduced by the action of the centrifugal fan and which has flowed along the curved portion smoothly flows into the straight portion. The provision of this straight portion enables the introduction passage to be widened radially outwardly with respect to the cyclone separator, as compared to an introduction passage which is simply curved and has no straight portion. This allows for increasing the cross-sectional area of the passage without hindering the swirl flow. As a result, air is transferred more smoothly than air in a case where the passage has a small cross-sectional area, and consequently, dust particles are separated effectively. In addition, since the increase in the cross-sectional area advantageously reduces the airflow resistance, effectiveness of separation is obtained with exerting almost no adverse influence on the performance of the engine.

A portable working machine provided with an engine as a power source includes:
  a centrifugal fan which is driven by the engine and which sucks and transfers air;
  a main passage which is provided in a housing space where the centrifugal fan is housed, and through which a cooling airflow containing dust particles that have been pressed, by the centrifugal fan, against an inner peripheral surface of a wall defining the housing space is transferred;
  a branch air inlet which is provided at a position displaced from the main passage, and through which air containing less dust particles than the airflow passing through the main passage is transferred toward an air filter;
  a cyclone separator which is provided upstream of the air filter and has a circular cross section; and
  an introduction passage which extends from the branch air inlet to the cyclone separator.

Further, the cyclone separator is arranged above the centrifugal fan and extends in an axial direction of a rotating shaft of the centrifugal fan, and
  when viewed in the axial direction, the introduction passage extends in a direction which forms an acute angle with a tangential direction of an inlet of the cyclone separator.

With this configuration in which the introduction passage above the branch air inlet is arranged to form an acute angle with the tangential direction of the cyclone separator, even if the passage has an increased cross-sectional area, the swirl flow is less hindered than a swirl flow of a case where air simply straightly flows in the tangential direction when air from which dust particles have been reduced by the action of the centrifugal fan 7 is flowing into the cyclone separator. In addition, since the formation of the acute angle allows for positioning the cyclone separator closer to the center line of the centrifugal fan, a compact configuration for the portable working machine is achievable.

A portable working machine provided with an engine as a power source includes:
  a centrifugal fan which is driven by the engine and which sucks and transfers air;
  a main passage which is provided in a housing space where the centrifugal fan is housed, and through which a cooling airflow containing dust particles that have been pressed, by the centrifugal fan, against an inner peripheral surface of a wall defining the housing space is transferred;
  a branch air inlet which is provided at a position displaced from the main passage, and through which air containing less dust particles than the airflow passing through the main passage is transferred toward an air filter;
  a cyclone separator which is provided upstream of the air filter and has a circular cross section; and
  an introduction passage which extends from the branch air inlet to the cyclone separator.

Further, an outlet-side cylindrical portion which has a smaller inside diameter than the cyclone separator is provided before an outlet of the cyclone separator, and
  an introduction through-hole communicating with a passage, via which the cooling airflow from the centrifugal fan flows and which passes through a heat-generating portion of the engine, is formed at a point located radially outward relative to the outlet-side cylindrical portion, and
  at least part of air which has been pressed against a cyclone inner peripheral surface of the cyclone separator is introduced, through the introduction through-hole, into the passage that passes through the heat-generating portion of the engine.

With this configuration, in the cyclone separator, the centrifugal force of the swirl flow moves dust particles toward the cyclone inner peripheral surface of the cyclone separator, and air from which dust particles have been reduced flows into the outlet-side cylindrical portion. The air which is present near the cyclone inner peripheral surface and which contains a large amount of dust particles is attracted by a high-speed and abundant airflow which passes through a passage passing through the heat-generating portion of the engine that is located downstream of the centrifugal fan, and discharged through the introduction through-hole (the so-called ejector effect). The utilization of this attraction of the cooling air discharged from the centrifugal fan eliminates the need for a dedicated passage component which is provided, in the conventional case, to utilize the suction force of the inlet portion of the centrifugal fan. This allows for reducing the number of the components and the size of the entire working machine.

A portable working machine provided with an engine as a power source, the working machine comprising:
  a centrifugal fan which is driven by the engine and which sucks and transfers air;
  a main passage which is provided in a housing space where the centrifugal fan is housed, and through which a cooling airflow containing dust particles that have been pressed, by the centrifugal fan, against an inner peripheral surface of a wall defining the housing space is transferred;
  a branch air inlet which is provided at a position displaced from the main passage, and through which air containing less dust particles than the airflow passing through the main passage is transferred toward an air filter;
  a cyclone separator which is provided upstream of the air filter and has a circular cross section; and
  an introduction passage which extends from the branch air inlet to the cyclone separator.

Further, an outlet-side cylindrical portion which has a smaller inside diameter than the cyclone separator is provided before an outlet of the cyclone separator, the air filter is provided in an upper portion of the portable working machine, and a space extending from an outlet of the outlet-side cylindrical portion toward the air filter is configured as a variation absorbing space which absorbs variation in a flow speed and a pressure in the space.

According to this configuration, the variation absorbing space, which is a relatively large space, is provided before the air filter. Therefore, when air that has left the cyclone separator flows into the large variation absorbing space, the flow speed and pressure of the air are reduced. Consequently, the dust particles collide against the air filter at a reduced speed, and mechanical wearing of the air filter is reduced. This allows for particularly effectively preventing the air filter from being mechanically worn by the air at a high pressure and a high flow speed in the case, such as the present invention, where not only the depression at engine manifold of the engine but also a high-pressure airflow transferred through the branch air inlet by the centrifugal fan are transferred toward the air filter. This also allows for making heavy dust particles and water droplets (fog) fall by gravity before the air reaches the inlet of the air filter, thereby preventing foreign substances such as dust particles and water droplets from reaching the air filter. In this manner, the need for providing a pre-filter such as a sponge before the air filter is eliminated and complicated maintenance work is avoided.

Here, in a side view, an inlet of the air filter may be positioned above the outlet of the cyclone separator.

With this configuration, as compared to the case where the air filter is positioned below the cyclone separator, the variation absorbing space extends more in the vertical direction, thereby preventing heavy dust particles and water droplets (fog) from reaching the air filter by making them fall by gravity.

Here, the air filter has a pillar shape, and is covered with a tubular filter cover, and at least a portion of a bottom surface defining the variation absorbing space may be inclined downwardly from a lower end portion of the filter cover toward a rear of the portable working machine.

This configuration, in which the variation absorbing space extends also below the filter cover that fixes the air filter, allows for effectively making heavy dust particles and water droplets (fog) fall by gravity and preventing them from reaching the inlet of the air filter positioned above them. Moreover, this configuration enables dust particles that have entered the space before the air filter to be deposited on the entire bottom surface defining the variation absorbing space inclusive of the portion extending with a downward inclination. This reduces the amount of dust particles that are deposited on the inlet of the air filter, thereby extending the maintenance cycle. Note that the air filter may have a cylindrical shape or a quadrangular prism shape, and the filter cover may also have a cylindrical shape or a quadrangular tubular shape.

A portable working machine provided with an engine as a power source, the working machine comprising:

a centrifugal fan which is driven by the engine and which sucks and transfers air;

a main passage which is provided in a housing space where the centrifugal fan is housed, and through which a cooling airflow containing dust particles that have been pressed, by the centrifugal fan, against an inner peripheral surface of a wall defining the housing space is transferred;

a branch air inlet which is provided at a position displaced from the main passage, and through which air containing less dust particles than the airflow passing through the main passage is transferred toward an air filter;

a cyclone separator which is provided upstream of the air filter and has a circular cross section; and an introduction passage which extends from the branch air inlet to the cyclone separator.

Further, an outlet-side cylindrical portion which has a smaller inside diameter than the cyclone separator is provided before an outlet of the cyclone separator, and a guide portion of which an end is oriented opposite to the air filter is formed in a space extending from an outlet of the outlet-side cylindrical portion toward the air filter.

In this respect, air which has left the cyclone separator usually flows straight toward the inlet of the air filter which has a lower pressure than the cyclone separator, and is less susceptible to dispersion. It is also difficult to make air and dust particles flow in a space outside the passage connecting the outlet of the outlet-side cylindrical portion of the cyclone separator to the inlet of the air filter. Therefore, dust particles and water droplets less easily fall by gravity in this space. To address this problem, the above configuration includes the guide portion of which the end is oriented opposite to the air filter. Therefore, air transferred from the cyclone separator is made to collide against the walls defining the space extending toward the air filter. Consequently, the flow speed of the air is reduced, and the air is dispersed in the space. In this manner, the air flows more uniformly, and the dust particles and water droplets more easily fall by gravity, thereby preventing the dust particles and water droplets from reaching the inlet of the air filter.

Here, the end of the guide portion may be curved in a circular arc shape which extends along an inner surface of the cyclone separator.

With this configuration, since the end of the guide portion is curved in a circular arc shape as the inner surface of the cyclone separator, the flow speed at the inlet of the outlet-side cylindrical portion is reduced in a period which makes a great contribution to the entry of the particles (a period in which the flow speed is maximized in one cycle), and as a result, a reduced amount of dust particles is allowed to flow into the outlet-side cylindrical portion.

In each of the above aspects of the present invention, the cyclone separator may be arranged in an upper portion of a body casing of the portable working machine such that the cyclone separator extends in a width direction of the portable working machine.

This configuration allows for preventing the portable working machine from increasing in size and for removing dust particles and water droplets effectively within as small a space as possible.

As can be seen from the foregoing, the present invention allows for increasing the durability of the engine by separating dust particles sufficiently with as few components as possible, and extending the maintenance cycle of an air filter.

BRIEF DESCRIPTION OF THE SEVERAL VIEWS OF THE DRAWING(S)

FIG. 13 is a perspective view showing, on an enlarged scale, a cyclone casing of a comparative example.

FIG. 14 is a perspective view showing, on an enlarged scale, a cyclone casing of a variant.

DETAILED DESCRIPTION OF VARIOUS EMBODIMENTS

Embodiments of the present invention will be described below with reference to the drawings.

—Configuration of Engine Cutter—

Figure 1:
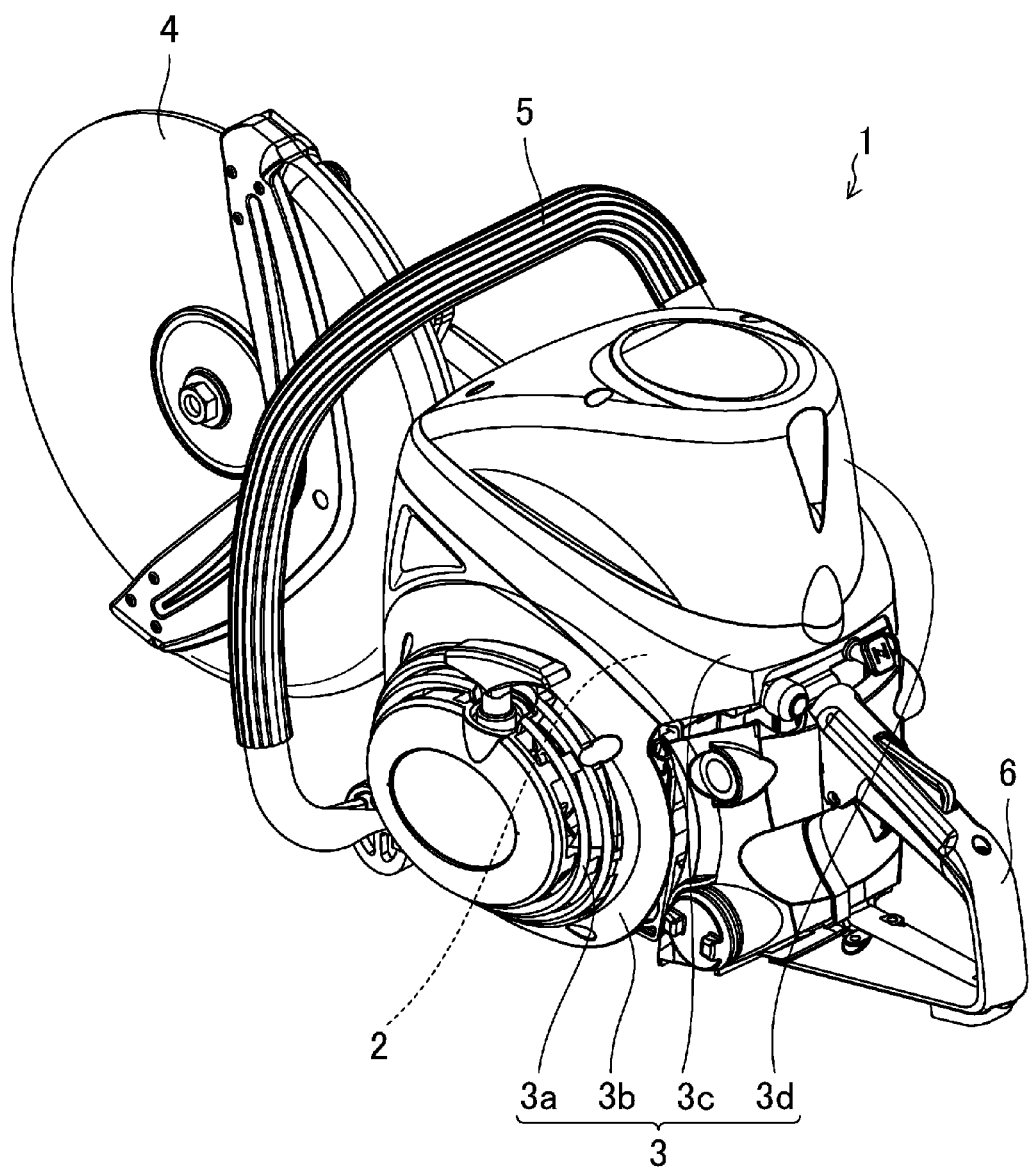
FIG. 1 is a perspective view showing, as a whole, a portable working machine according to an embodiment of the present invention.

FIG. 1 shows a portable working machine of this embodiment, which is configured as an engine cutter 1. This engine cutter 1 is provided with an engine 2 as a power source. The engine 2 is housed in a body casing 3, and configured to drive a disc blade 4 with its power, thereby cutting concrete and other materials. A front handle 5 and a rear handle 6 are respectively provided on the front side and rear side of the body casing 3.

The body casing 3 is comprised of a plurality of components. Specifically, the body casing 3 includes mainly a lower casing 3b which is arranged close to the lateral sides of the engine 2 and which has an air inlet opening 3a, and an upper casing 3c which is arranged above the engine 2.

Figure 2:
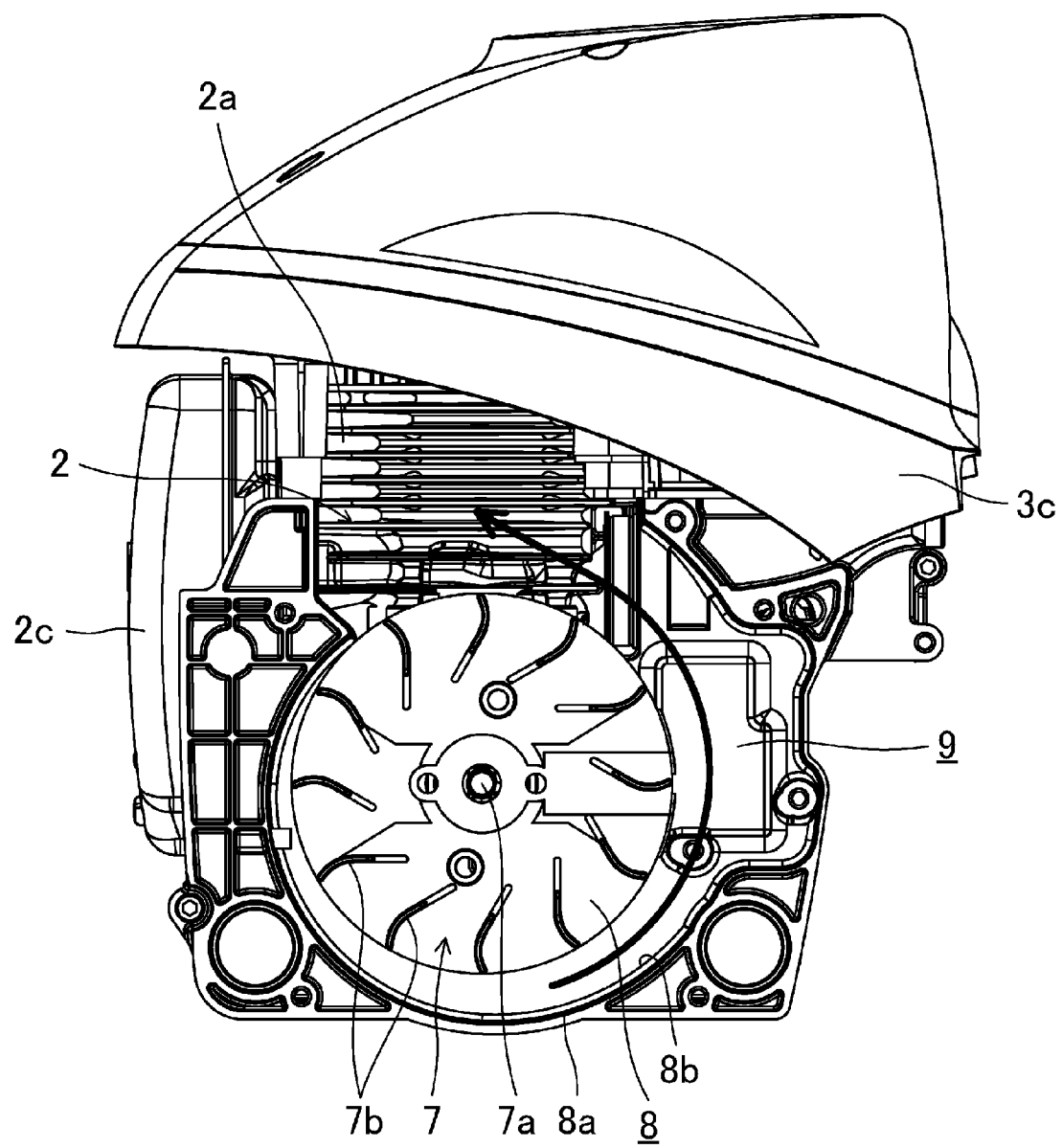
FIG. 2 is a side view showing a centrifugal fan and its surroundings.

As shown in FIG. 2, the engine cutter 1 includes therein a centrifugal fan 7 which is driven by the engine 2 and which sucks and transfers air. The centrifugal fan 7 has a rotating shaft 7a which extends in the width direction of the engine cutter 1, just like the rotating shaft of the engine 2. The centrifugal fan 7 further has a plurality of impellers 7b which are rotated to introduce air containing dust particles through the air inlet opening 3a of the lower casing 3b. The impellers 7b accelerate this air in a fan casing 8a which externally covers the centrifugal fan 7 and in a housing space 8 surrounded by the lower casing 3b and a crankcase of the engine 2 arranged inward. Consequently, a cooling airflow is generated to cool the engine 2. The cooling airflow contains dust particles which have been pressed, by the centrifugal force, against a radially outermost portion 8b of the inner peripheral surface of the fan casing 8a, and passes through a main passage 9 as indicated by the arrow and reaches, for example, a cylinder portion 2a that is a main heat-generating portion of the engine 2. The radially outermost portion 8b is a portion of the inner peripheral surface of the fan casing 8a, and is positioned radially outward with respect to the centrifugal fan 7. Since cooling is preferential for the cylinder portion 2a, the airflow may contain dust particles and water droplets.

Figure 3:
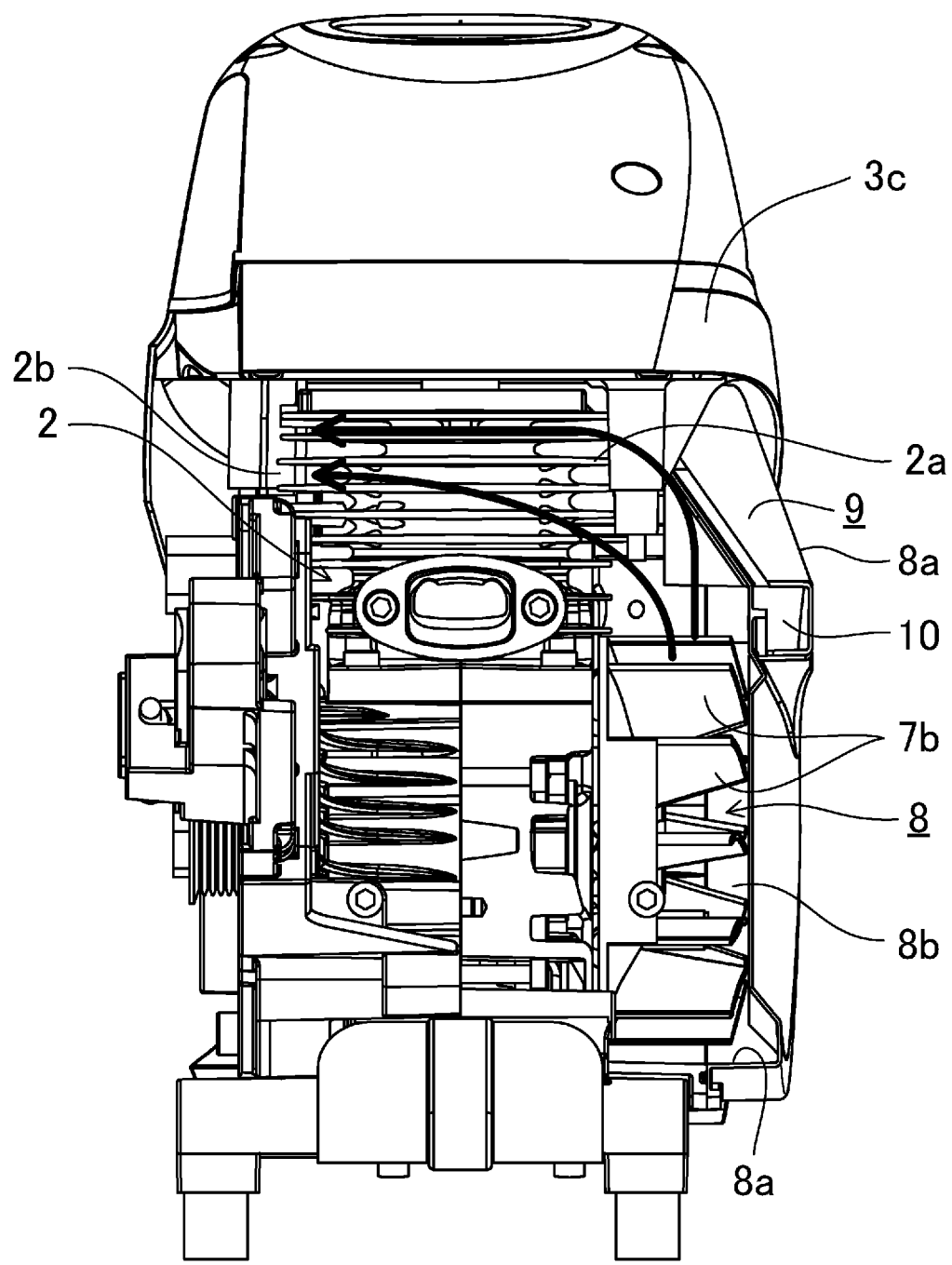
FIG. 3 is a front view showing the centrifugal fan, a main passage, and their surroundings.
Figure 4:
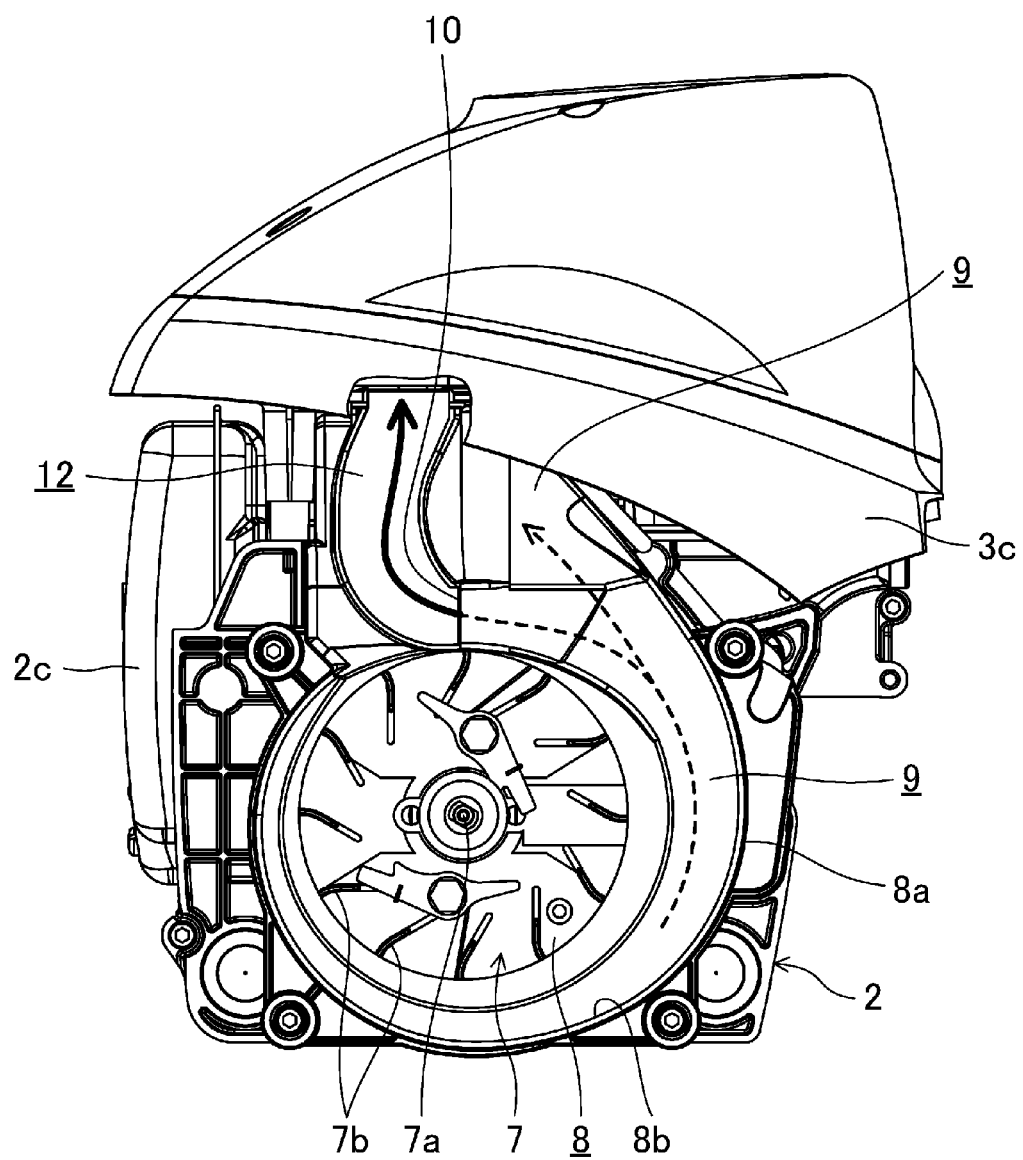
FIG. 4 is a side view showing an introduction passage and its surroundings.

As shown in FIGS. 3 and 4, a branch air inlet 10 is provided at a position which is displaced from the main passage 9 toward the centrifugal fan 7 (i.e. far from the radially outermost portion 8b of the inner peripheral surface). Through this branch air inlet 10, air containing less dust particles than air passing through main passage 9 is transferred toward an air filter 18 which will be described later.

Figure 7:
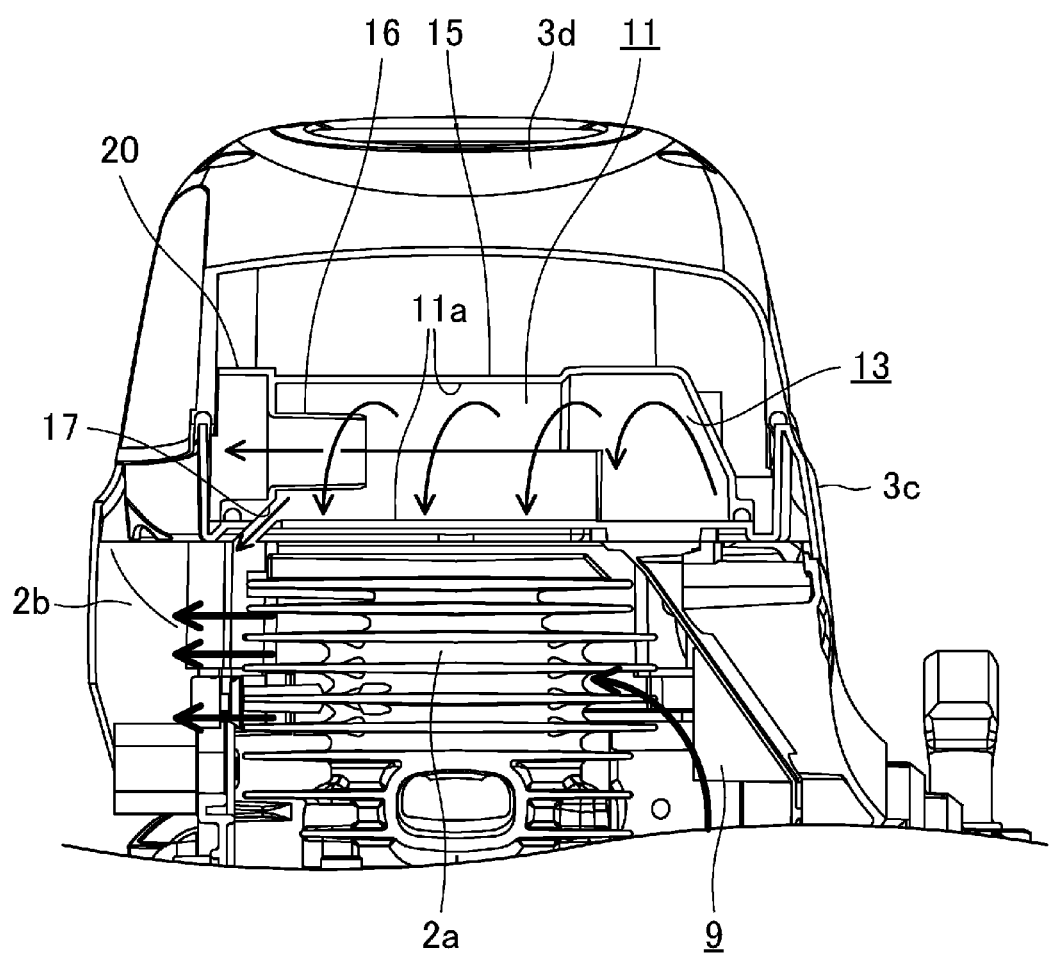
FIG. 7 is a front view showing, on an enlarged scale, the main passage, the introduction passage, the cyclone separator, and their surroundings.

Further, as shown in FIG. 7 and other drawings, a cyclone separator 11 which has a circular cross section is provided upstream of the air filter 18. The cyclone separator 11 is arranged above the centrifugal fan 7 and extends in the axial direction of the rotating shaft 7a of the centrifugal fan 7 (i.e., in the width direction of engine cutter 1). This configuration allows for preventing the engine cutter 1 from increasing in size and removing dust particles and water droplets effectively within as small a space as possible.

Figure 5:
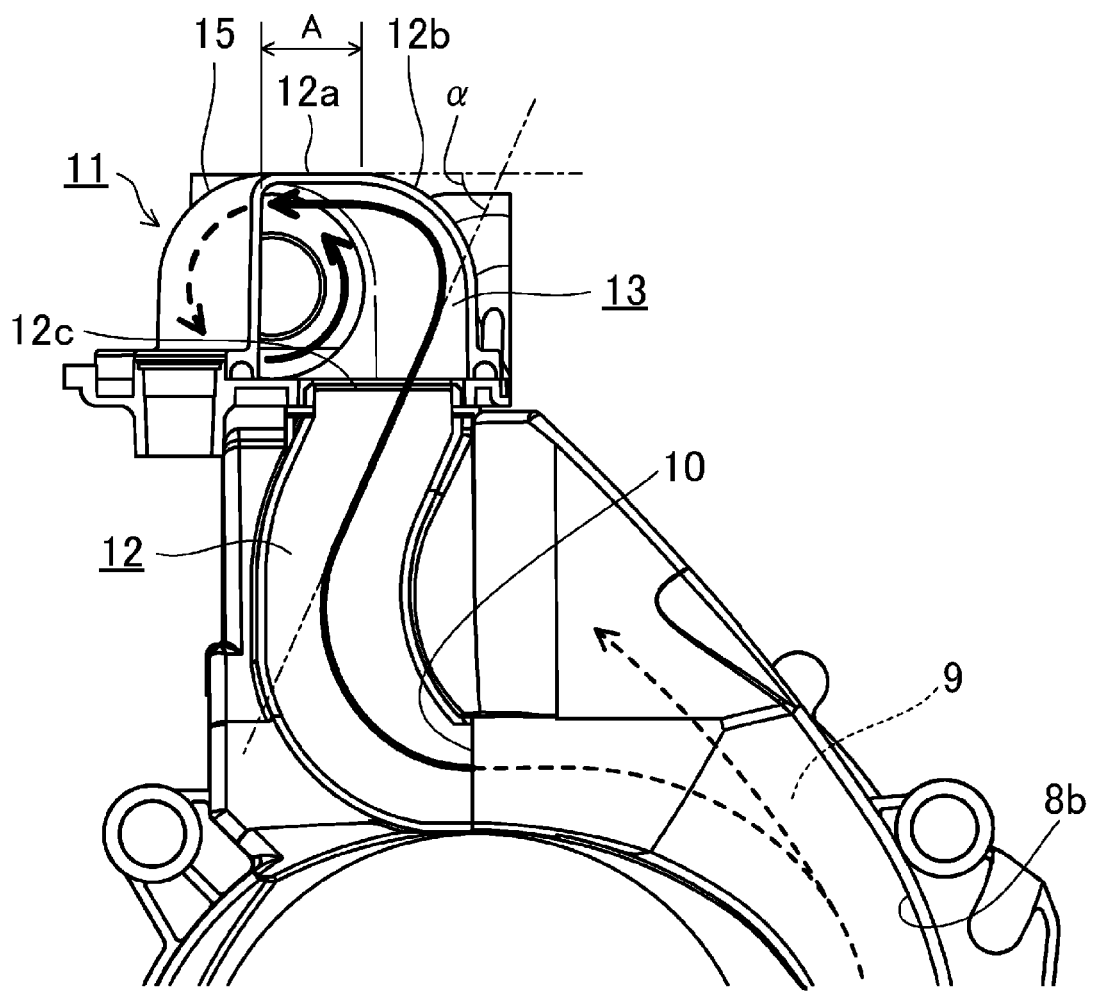
FIG. 5 is a side view showing, on an enlarged scale, the introduction passage and its surroundings.

As shown in FIGS. 4 and 5, an introduction passage 12 extends from the branch air inlet 10 to the cyclone separator 11. The introduction passage 12 includes an upstream portion and a downstream portion with a connection opening 12c (which opens in the upper casing 3c (see FIG. 6)) interposed therebetween. The upstream portion corresponds to a portion surrounded by the inner side of the lower casing 3b and an outer ribbed wall of an upper portion of the fan casing 8a. The downstream portion is connected to the inlet of the cyclone separator 11. The introduction passage 12 is curved in an S-shape when viewed in the axial direction of the centrifugal fan 7, i.e., in the width direction of the engine cutter 1 (and, curved in an inverted S-shape when viewed from outside of the working machine, as shown in FIG. 5). In other words, when viewed in the axial direction of the cyclone separator 11, the introduction passage 12 has a straight portion 12a (the portion indicated by A in FIG. 5) which extends in a tangential direction of the cyclone separator 11 (in the lateral direction of FIG. 5) and continues to the cyclone separator 11, and a curved portion 12b which extends in an arc and continues to the straight portion 12a. Further, when viewed in the axial direction of the cyclone separator 11, the introduction passage 12 extends in the direction which forms an acute angle α with the tangential direction of the inlet of the cyclone separator 11. Specifically, in the example shown in FIG. 5, the portion (the upstream portion) of the introduction passage 12 located under the connection opening 12c extends in the direction that forms the acute angle α with the straight portion 12a that extends in the tangential direction of the circular inlet of the cyclone separator 11.

Figure 6:
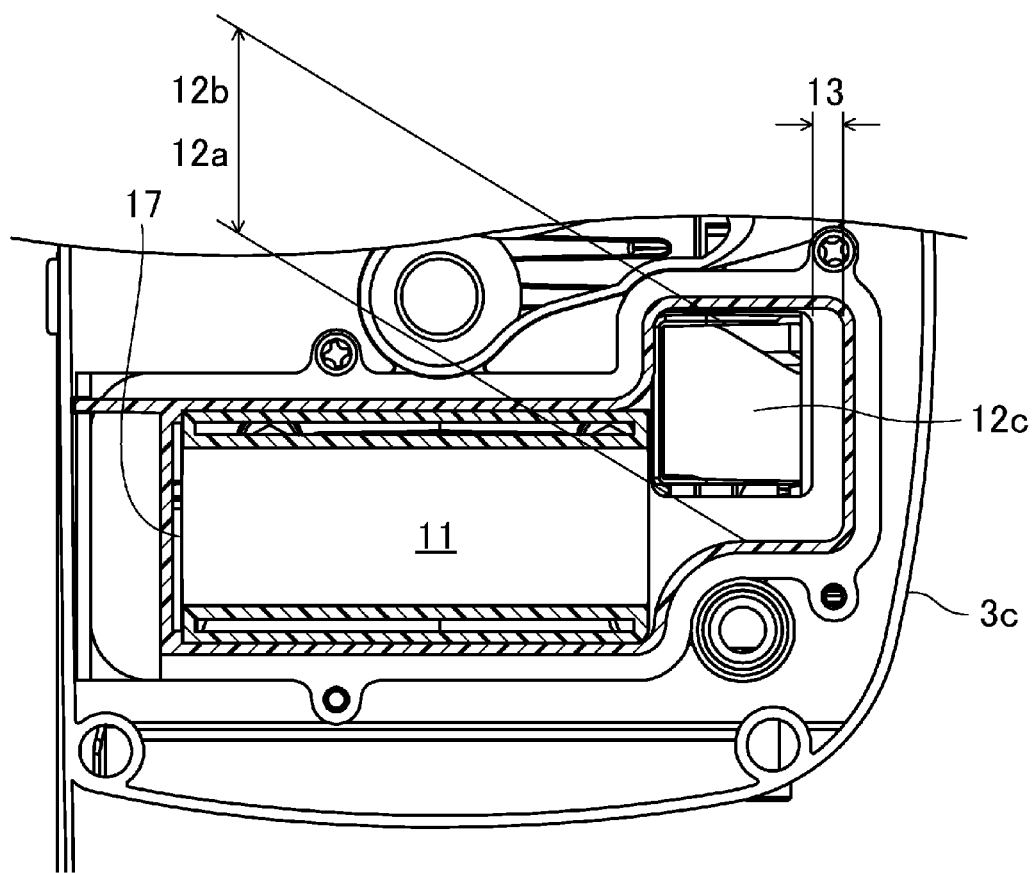
FIG. 6 is a plan view showing, on an enlarged scale, a margin space, a cyclone separator, and their surroundings.

As shown in FIGS. 5-7, a margin space 13 is formed in the introduction passage 12 before the cyclone separator 11. The margin space 13 is formed to have an increased cross-sectional area in a passage portion for which the connection opening 12c serves as the inlet and which is defined by the curved portion 12b and the straight portion 12a, and allows at least part of air introduced through the connection opening 12c to flow therein. The margin space 13 is in the passage portion defined by the connection opening 12c, the curved portion 12b, and the straight portion 12a, and formed by making an associated portion of the passage portion protrude, relative to the outward side of the connection opening 12c (the right side of the connection opening 12c in FIG. 6), opposite to the inlet of the cyclone separator 11 in the axial direction of the cyclone separator 11 (rightward in FIG. 6). Specifically, the margin space 13 is inside a cyclone casing 15 (see FIG. 11) which covers the connection opening 12c of the introduction passage 12 formed in the upper casing 3c and which forms part of the cyclone separator 11. In this embodiment, the cyclone casing 15 and the upper casing 3c respectively constitute the upper and lower portions of the cyclone separator 11. That is to say, these two components are combined together to form the cyclone separator 11. The cyclone casing 15 is made of a resin molding which can be molded in a complicated shape. A swirl flow to occur in the cyclone separator 11 starts at the margin space 13. Note that the margin space 13 may be formed by making an associated portion of the upper casing 3c protrude opposite to the inlet of the cyclone separator 11 in the axial direction of the cyclone separator 11.

Figure 8:
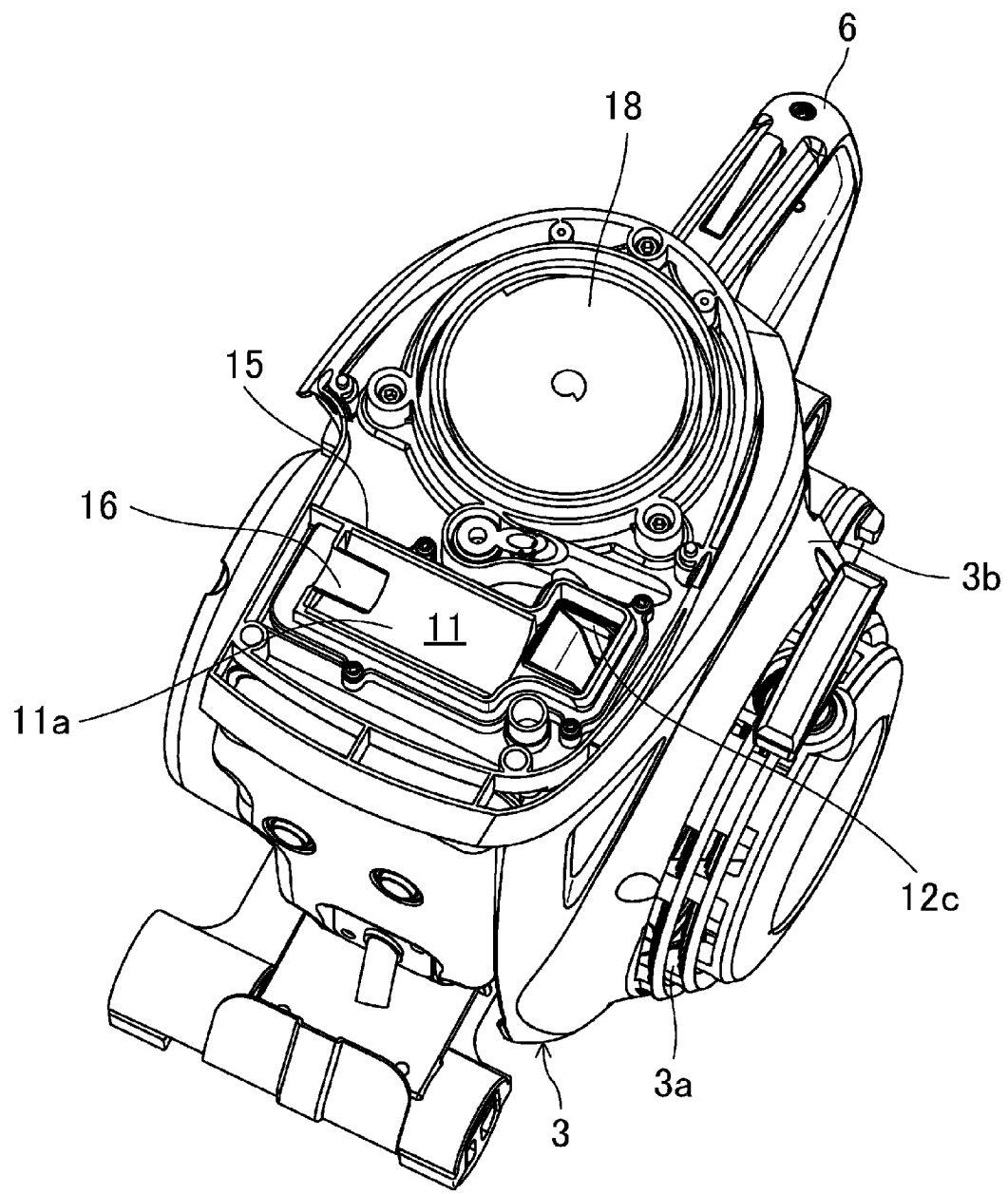
FIG. 8 is a perspective view of an engine cutter of which an upper portion is cut away so that the inside is shown.
Figure 9:
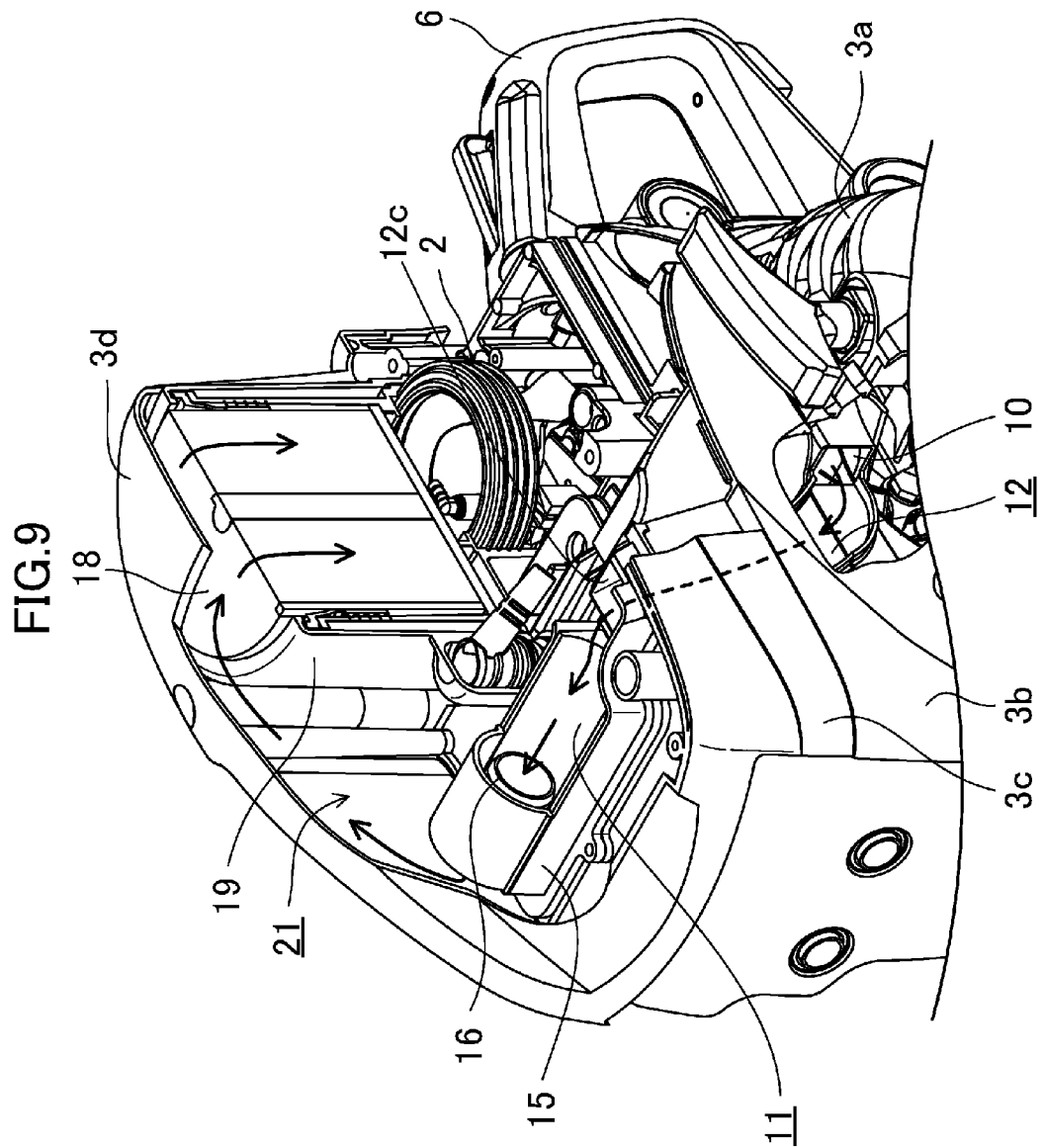
FIG. 9 is a perspective view showing, on an enlarged scale, an air filter which is partially cut away to show the inside.

As shown in FIGS. 7-9, an outlet-side cylindrical portion 16 which has a smaller inside diameter than the cyclone separator 11 is provided in the cyclone separator 11 before the outlet of the cyclone separator 11. For example, this outlet-side cylindrical portion 16 has a circular cross section and is formed as an integral portion of the cyclone casing 15 when the cyclone casing 15 is molded so as to be concentric with the cyclone separator 11. As shown in FIGS. 6 and 7, an introduction through-hole 17 (which opens in the upper casing 3c) is formed in the inner peripheral surface 11a of the cyclone separator 11 that is positioned radially outward relative to the outlet-side cylindrical portion 16. The introduction through-hole 17 communicates with an outlet portion 2b for the cooling airflow from cylinder fins of the cylinder portion 2a that is provided in a downstream portion of the main passage 9. These components are arranged such that at least part of air which has been pressed against the cyclone inner peripheral surface of the cyclone separator 11 is introduced, through the introduction through-hole 17, into the outlet portion 2b for the cooling airflow from the cylinder fins of the cylinder portion 2a. Here, the so-called ejector effect is utilized by which air is sucked and drawn from the introduction through-hole 17 due to the high flow speed and large quantity of the cooling airflow passing through the outlet portion 2b for the cooling airflow from the cylinder fins of the cylinder portion 2a. Therefore, the introduction through-hole 17 is designed to have an appropriate size that is neither too large nor too small. As shown in FIGS. 2 and 4, a muffler 2c is provided in front of the cylinder portion 2a.

Figure 10:
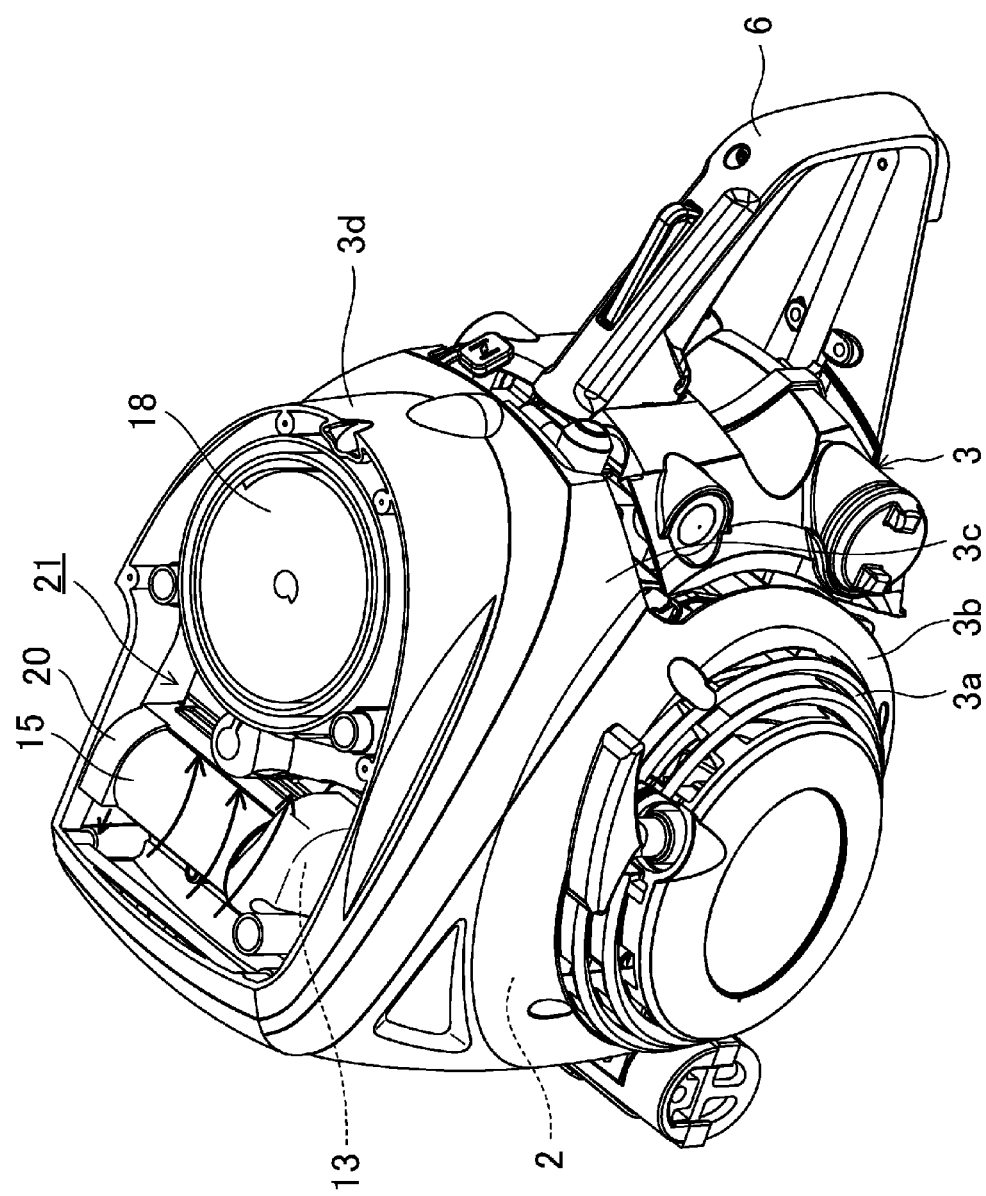
FIG. 10 is a perspective view showing an airflow which is entering the air filter.

As shown in FIGS. 9 and 10, the air filter 18 is provided in a space surrounded by the upper casing 3c and a top cover 3d that constitute an upper portion of the engine cutter 1. The air filter 18 has, for example, a round pillar shape and is covered with a cylindrical filter cover 19. Although the filter cover 19 is integral with the upper casing 3c in this embodiment, the present invention is not limited to this configuration. The filter cover 19 and the upper casing 3c may be separate components and hermetically attached to each other, for example. The air filter 18 may have a quadrangular prism shape, and the filter cover 19 may also have a quadrangular tubular shape. In a side view, the inlet of the air filter 18 is positioned above the outlet of the cyclone separator 11 (i.e. the outlet of the outlet-side cylindrical portion 16).

Figure 11:
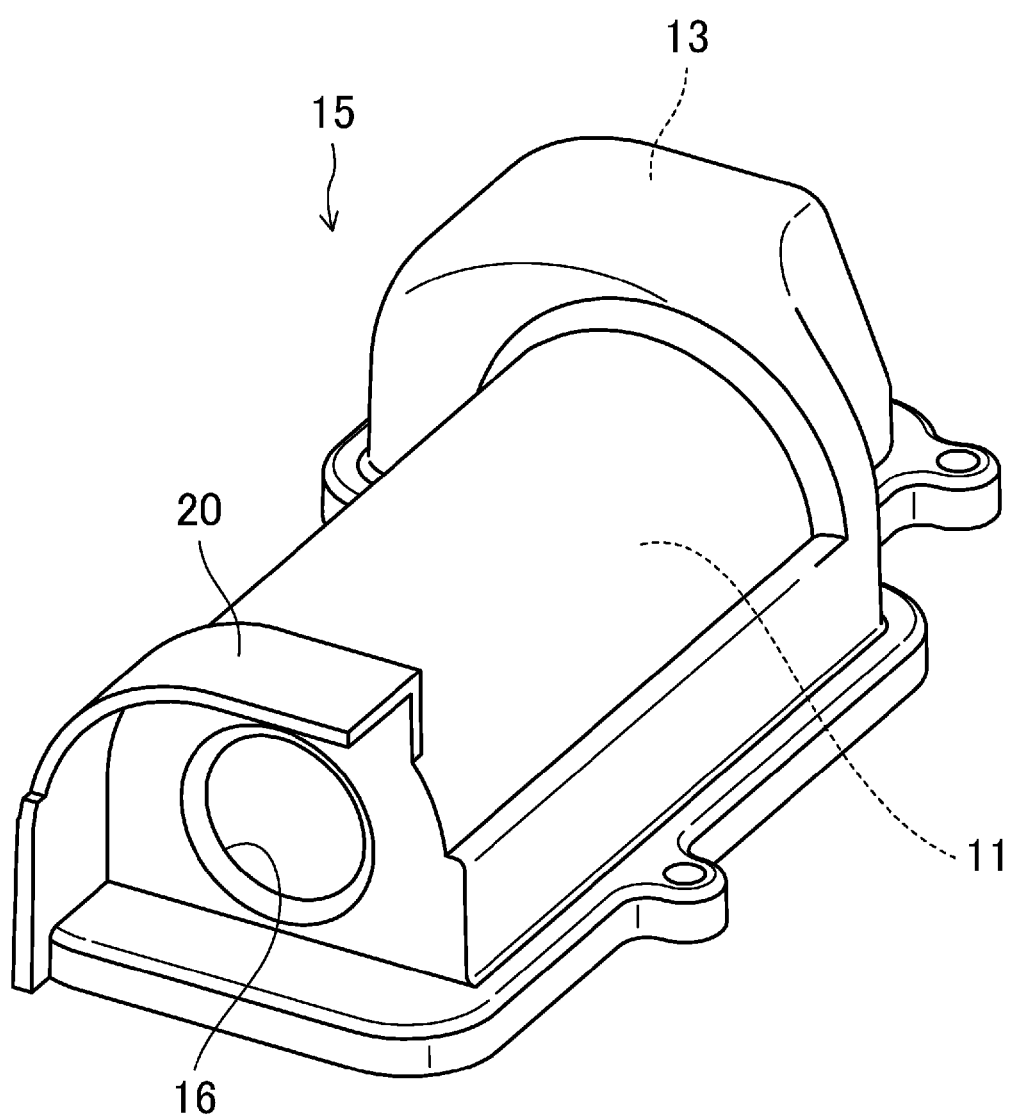
FIG. 11 is a perspective view showing, on an enlarged scale, a cyclone casing.

As shown in FIG. 11, in a space extending from the outlet of the outlet-side cylindrical portion 16 toward the air filter 18, a guide portion 20 is formed to extend in the circumferential direction of the swirl flow occurring in the cyclone separator 11. As shown in FIG. 10, an end (the outflow portion) of the guide portion 20 is oriented opposite to the air filter 18 (i.e., toward the front of the engine cutter 1).

Figure 12:
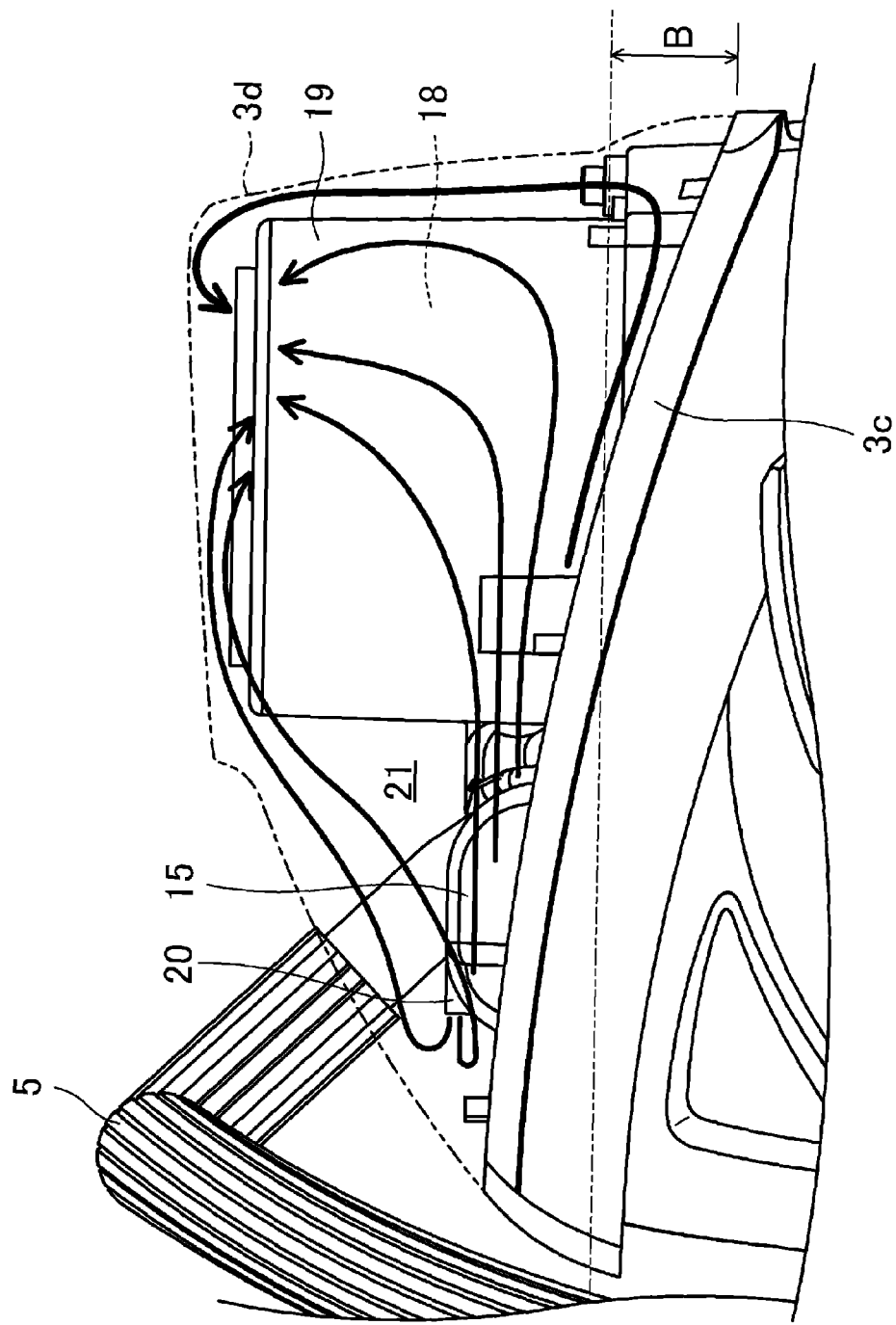
FIG. 12 is a side view showing how air flows in a variation absorbing space.

A space which is surrounded by an upper portion of the upper casing 3c and the inner side of the top cover 3d and which extends from the outlet of the outlet-side cylindrical portion 16 toward the air filter 18 serves as a variation absorbing space 21 which absorbs variation in the flow speed and pressure in this space. As shown in FIG. 12, the bottom surface defining the variation absorbing space 21 is downwardly inclined from the lower end of the filter cover 19 toward the rear of the working machine (i.e., toward the rear handle 6). This inclination makes the space extend downwardly over the bottom surface of the upper casing 3c near the lower end of the filter cover 19 in the region indicated by B in FIG. 12. Further, clearance is ensured between the top cover 3d and the outlet of the outlet-side cylindrical portion 16 and between the top cover 3d and the outer periphery of the filter cover 19 positioned opposite to the outlet of the outlet-side cylindrical portion 16. This clearance also forms part of the variation absorbing space 21.

Here, the variation in the flow speed and pressure refers to variation in the flow speed and pressure that the numbers of revolutions of the engine 2 and the centrifugal fan 7 cause in a passage which is present upstream of the air filter 18. An increase in the number of revolutions of the engine 2 increases the intake air flow speed and depression at engine manifold. In this embodiment, in particular, air blown out by the centrifugal fan 7 is transferred toward the air filter 18 through the branch air inlet 10. Therefore, the speed and pressure of the air blown out by the centrifugal fan 7 also increase as the number of revolutions of the centrifugal fan 7 increases. These variations are absorbed by the variation absorbing space 21.

—Airflow to Air Filter—

The airflow in the engine cutter 1 configured as described above is now described in detail with reference to the drawings.

To use the engine cutter 1 of this embodiment to cut a concrete mass, for example, the engine 2 is started to rotate the blade 4, and the concrete mass is cut with this blade 4 pressed thereinto. At this time, dust particles of concrete are generated. When a water pipe is cut with the engine cutter 1, water on the water pipe may be scattered. When the engine 2 is in operation, its heat generating portions such as the cylinder portion 2a need to be cooled, and at the same time, air which does not contain dust particles needs to be supplied to the combustion chamber of the engine 2.

Upon starting of the engine 2, the centrifugal fan 7 is rotated, and air is sucked through the air inlet opening 3a by the action of the impellers 7b. Therefore, during cutting, a large amount of dust particles of concrete and other foreign particles are sucked together with the air.

As shown in FIGS. 2 and 3, cooling air containing dust particles that have been pressed mainly against the radially outermost portion 8b of the inner peripheral surface of the fan casing 8a by the centrifugal fan 7 is made to pass through the main passage 9 and transferred to the cylinder portion 2a and other heat generating portions, which are consequently cooled. The air that has passed through the main passage 9 and cooled the heat generating portions is discharged from the side opposite to the centrifugal fan 7 (the left side in FIG. 3).

As shown in FIGS. 3 and 4, the air entering the introduction passage 12 through the branch air inlet 10 that is provided at the position displaced from the main passage 9 toward the centrifugal fan 7 (i.e., far from the radially outermost portion 8b of the inner peripheral surface) contains less dust particles than the air in the main passage 9. At this stage, dust particles having a large mass have been removed by the action of the centrifugal fan 7, whereas the dust particles having a small mass remain to be removed.

As shown in FIG. 5, air to be transferred into the cyclone separator 11 from the introduction passage 12 is made to move in the tangential direction of the cyclone separator 11 (from right to left in FIG. 5) so as to generate a swirl flow in the cyclone separator 11. According to the conventional manner in which air is transferred simply straight in the tangential direction, if an inlet passage (corresponding to the straight portion 12a) which is connected to the cyclone separator 11 is designed to have an excessively large size, the swirl flow will be adversely hindered. On the other hand, according to this embodiment, air from which dust particles have been reduced by the action of the centrifugal fan 7 and which has flowed along the curved portion 12b smoothly flows into the straight portion 12a. The provision of this straight portion 12a enables the introduction passage 12 to be widened radially outwardly with respect to the cyclone separator 11, as compared to an introduction passage 12 which is simply curved and has no straight portion 12a. This allows for increasing the cross-sectional area of the passage without hindering the swirl flow. As a result, air is transferred more smoothly than air in a case where the passage has a small cross-sectional area, and consequently, dust particles are separated effectively. In addition, since the increase in the cross-sectional area advantageously reduces the airflow resistance, effectiveness of separation is obtained with exerting almost no adverse influence on the performance of the engine.

Furthermore, according to this embodiment, the introduction passage 12 is provided to form the acute angle α with the cyclone separator 11. Therefore, even if the passage has an increased cross-sectional area, when air from which dust particles have been reduced by the action of the centrifugal fan 7 is flowing into the cyclone separator 11, the swirl flow is less hindered than a swirl flow of a case where air flows simply straightly in the tangential direction. In addition, since the formation of the acute angle α allows for positioning the cyclone separator 11 to the right in FIG. 5, that is to say, closer to the center line of the centrifugal fan 7 (i.e., the axis of the cylinder of the cylinder portion 2a), a compact configuration for the engine cutter 1 is achievable.

As shown FIGS. 5-7, when air from which dust particles have been reduced by the action of the centrifugal fan 7 flows into the cyclone separator 11 through the connection opening 12c of the introduction passage 12, a swirl flow to occur later in the cyclone separator 11 starts at the margin space 13 provided before the cyclone separator 11. This means that the swirl flow in the cyclone separator 11 occurs earlier than a swirl flow occurring in a case where no margin space 13 is provided. Further, the air smoothly swirls in the cyclone separator 11 thereafter. As can be seen from the foregoing, since the margin space 13 serves as an approach run space for the swirl flow, the swirl flow makes an appropriate number of turns within a short distance. In this manner, effective separation of dust particles is achieved in the cyclone separator 11.

As shown in FIG. 7, in the cyclone separator 11, the centrifugal force of the swirl flow moves dust particles toward the cyclone inner peripheral surface 11a of the cyclone separator 11, and air from which dust particles have been reduced flows into the outlet-side cylindrical portion 16. Air which is present near the cyclone inner peripheral surface 11a and which contains a large amount of dust particles is attracted by a high-speed airflow flowing in the outlet portion 2b for cooling air from the cylinder fins of the cylinder portion 2a, and discharged through the introduction through-hole 17 (the so-called ejector effect). The utilization of this attraction of the outlet portion 2b for cooling air from the cylinder fins of the cylinder portion 2a eliminates the need for a dedicated passage component which is provided, in the conventional case, to utilize the suction force of the inlet portion of the centrifugal fan 7. This allows for reducing the number of the components and the size of the entire working machine.

As shown in FIG. 9, air which has left the cyclone separator 11 usually flows straight toward the inlet of the air filter 18 which has a lower pressure than the cyclone separator 11, and is less susceptible to dispersion. It is therefore difficult for dust particles and water droplets contained in the air to fall by gravity. According to this embodiment, however, since the end (the outflow portion) of the guide portion 20 is oriented opposite to the air filter 18 as shown in FIGS. 10 and 11, air transferred from the cyclone separator 11 is made to collide against the inner surfaces of the upper casing 3c and the top cover 3d that define the variation absorbing space 21. Consequently, the flow speed of the air is reduced, and the air is dispersed in the variation absorbing space 21. In this manner, the air flows more uniformly, and the dust particles and water droplets more easily fall by gravity, thereby preventing the dust particles and water droplets from reaching the inlet of the air filter 18. Further, the dust particles and water droplets that the cyclone separator 11 has failed to separate flow out of the outflow portion of the guide portion 20, and some of these dust particles and water droplets that are relatively heavy are separated from the airflow when colliding against the inner surfaces of the upper casing 3c and the top cover 3d. The separated dust particles and water droplets fall by gravity to be deposited on a front-side portion of the bottom surface of the upper casing 3c. The cyclone casing 15 functions as a weir to hinder the deposited dust particles from being blown up again by airflow and from reaching the inlet of the air filter 18.

Since the variation absorbing space 21, which is a relatively large space, is provided before the air filter 18, the flow speed and pressure of the air are reduced when air that has left the cyclone separator 11 flows into the variation absorbing space 21, which is significantly larger than the cyclone separator 11. Consequently, the dust particles collide against the air filter 18 at a reduced speed, and mechanical wearing of the air filter 18 is reduced. This allows for particularly effectively preventing the air filter 18 from being subjected to application of a high pressure in the case, such as this embodiment, where not only depression at engine manifold of the engine but also a high-pressure airflow transferred through the branch air inlet 10 by the centrifugal fan 7 are transferred toward the air filter 18. This also allows for making heavy dust particles and water droplets (fog) fall by gravity before the air reaches the inlet of the air filter 18, thereby preventing foreign substances such as dust particles and water droplets from reaching the air filter 18. In this manner, the need for providing a pre-filter such as a sponge before the air filter 18 is eliminated and complicated maintenance work is avoided.

Furthermore, as shown in FIG. 12, the bottom surface defining the variation absorbing space 21 is inclined downward from the lower end of the filter cover 19 toward the rear of the working machine (i.e., toward the rear handle 6). In addition, between the filter cover 19 and the top cover 3d, clearance is ensured not only above the top of the filter 18 that serves as the inlet of air filter 18 but also around the cylindrical lateral face of the filter cover 19. Therefore, air flows below and around the filter cover 19 that fixes the air filter 18, which allows for effectively making heavy dust particles and water droplets (fog) fall by gravity, and consequently, preventing them from reaching the inlet of the air filter 18 that is positioned above the lower end of the filter cover 19 and an area surrounding the lower end. Moreover, this configuration enables dust particles that have entered the space extending before the air filter 18 to be deposited on the entire bottom surface defining the variation absorbing space 21 inclusive of the portion extending with a downward inclination. This reduces the amount of dust particles that are deposited on the inlet of the air filter 18, thereby extending the maintenance cycle.

Since the inlet of the air filter 18 is positioned above the cyclone separator 11, the variation absorbing space 21 extends also in the vertical direction, which allows for making heavy dust particles and water droplets (fog) fall by gravity and preventing them from reaching the inlet of the air filter 18.

Further, the extension of the vibration absorbing space 21 also below the filter cover 19 that fixes the air filter 18 allows for making the heavy dust particles and water droplets (fog) fall more effectively by gravity and preventing them from reaching the inlet of the air filter 18 that is positioned above.

—Simulation to Analyze Effect of Guide Portion—

Next, the results of a simulation that was conducted to analyze the effect brought about by the guide portion 20 are described. FIG. 13 shows, as a comparative example, a cyclone casing 15' which has no guide portion 20. FIG. 14 shows, as a variant, a cyclone casing 115 which has a simple vertical guide portion 120.

Figure 15:
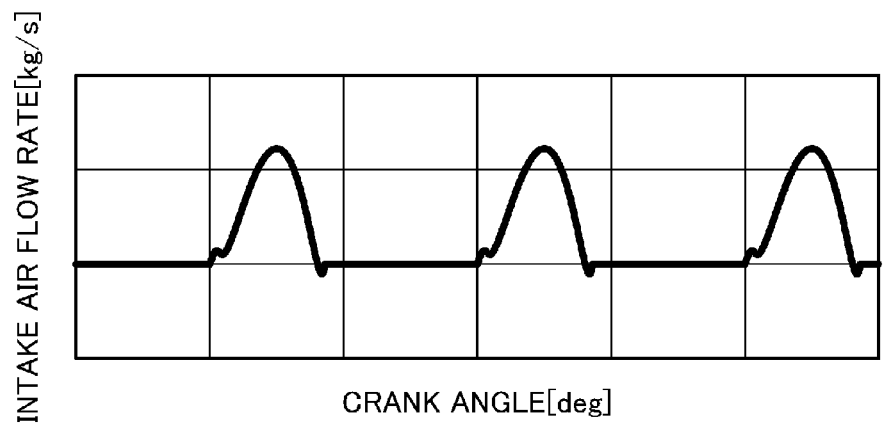
FIG. 15 is a graph showing variation in intake air flow rate.
Figure 16:
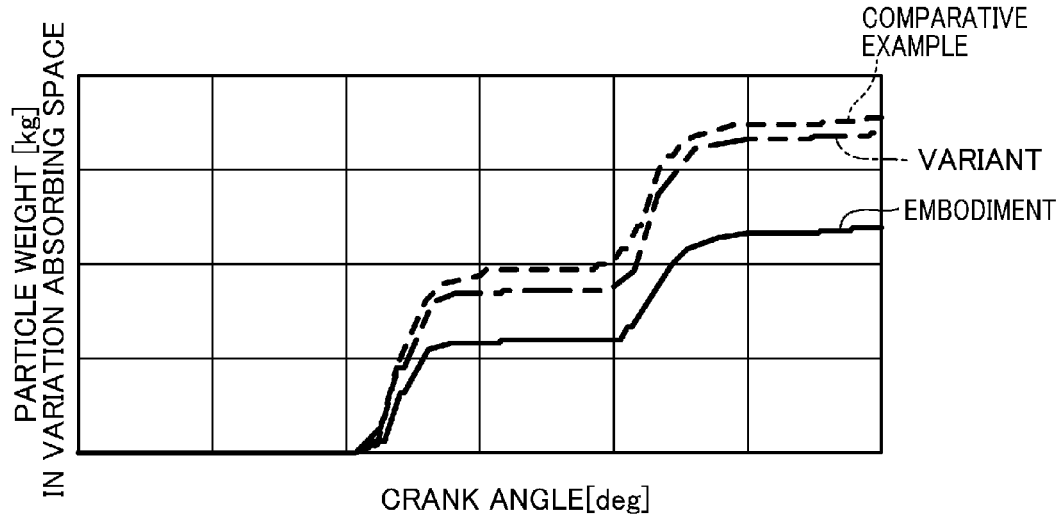
FIG. 16 is a graph showing variation in weight of particles.

The analysis condition was as follows: the number of revolution of the engine was set to 9000 rpm; the inlet pressure at the inlet (the branch air inlet 10) of the introduction passage 12 was set to be slightly higher than atmospheric pressure; and the pressure at the introduction through-hole 17 was set to atmospheric pressure. Variation in mass flow rate caused in the air filer 18 in intake strokes of the engine was repeatedly defined every cycle (FIG. 15). FIG. 16 approximately shows the results of the simulation, specifically, the weights of particles that entered the variation absorbing space 21.

As can be seen from the results, the weight of particles resulting from the cyclone casing 115 of the variant that was provided with the vertical guide portion 120 is slightly less than the weight of particles resulting from the cyclone casing 15' of the comparative example. The results confirm the following. In the variant having the vertical guide portion 120, air that left the outlet-side cylindrical portion 16 collides against this guide portion 120, and consequently, the flow speed is slightly reduced near the inlet of the outlet-side cylindrical portion 16 in a period which makes a great contribution to the entry of the particles into the variation absorbing space 21 (a period in which the flow speed is maximized in one cycle). As a result, a reduced amount of dust particles is allowed to flow into the outlet-side cylindrical portion 16.

On the other hand, the cyclone casing of this embodiment is capable of reducing the weight of particles significantly, as compared to the cyclone casing of the comparative example. The reason for this is as follows: Since the guide portion 20 of this embodiment has a circular arc shape like the inner surface of the cyclone separator 11, the flow speed in the period in which the flow speed is maximized in one cycle is more easily reduced at the inlet of the outlet-side cylindrical portion 16, and the amount of dust particles flowing into the outlet-side cylindrical portion 16 is reduced. Although the provision of the vertical guide portion 120 of the variant can reduce the amount of dust particles, the guide portion 20 of this embodiment that extends in the circumference direction of the swirl flow occurring in the cyclone separator 11 allows for still further reduction of the amount of the dust particles.

Thus, the engine cutter 1 of this embodiment enables, with as few components as possible, an increase in the durability of the engine by sufficiently separating dust particles and extension of the maintenance cycle of the air filter 18.

—Simulation to Analyze Effect of Margin Space—

Next, the results of simulation that was conducted to analyze the effect brought about by the margin space 13 are described.

Figure 17:
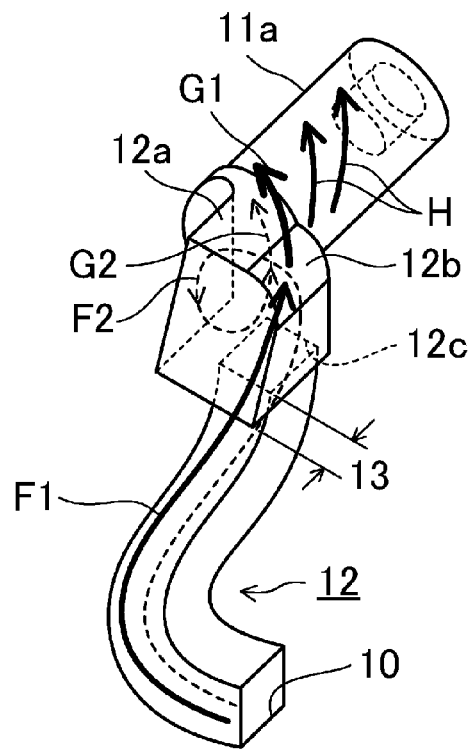
FIG. 17 is a schematic view showing the results of a simulation conducted to analyze an airflow in an introduction passage having a margin space, according to an embodiment of the present invention.
Figure 18:
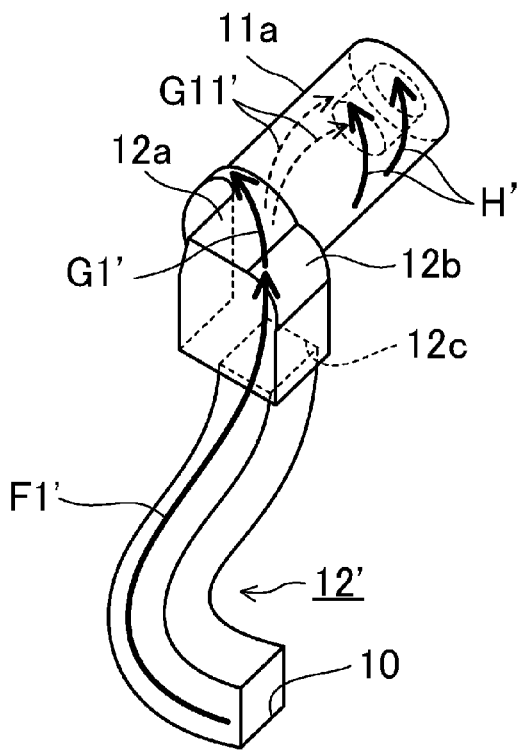
FIG. 18 is a schematic view showing the results of a simulation conducted to analyze an airflow in an introduction passage of having no margin space, according to a comparative example.

FIGS. 17 and 18 schematically show the results of an analysis of the airflows passing from the introduction passage 12 to the cyclone separator 11. FIG. 17 shows the airflow of this embodiment, and FIG. 18 shows the airflow of a comparative example in which an introduction passage 12' includes no margin space 13.

In this embodiment shown in FIG. 17, the margin space 13 is formed by making an associated portion of the cyclone casing 15 (not shown) protrude opposite to the inlet of the cyclone separator 11 in the axial direction of the cyclone separator 11.

On the other hand, in the introduction passage 12' of the comparative example shown in FIG. 18, the passage portion extending from the connection opening 12c to the inlet of the cyclone separator 11 (in the shown example, the passage portion including the straight portion 12a and the curved portion 12b) has a width which is substantially the same as the width of the connection opening 12c, in the lateral direction of the working machine.

The analysis condition was follows: the number of revolution of the engine was set to 10,000 rpm; the pressure at the inlet (the branch air inlet 10) of the introduction passages 12 and 12' was set to be slightly higher than atmospheric pressure; and the pressure at the introduction through-hole 17 was set to atmospheric pressure. Variation in mass flow rate caused in the air filer 18 in intake strokes of the engine was repeatedly defined every cycle.

The results of the simulation show that the provision of the margin space 13 as in the embodiment significantly reduces (by about 56%) the weight of particles that entered the cyclone separator 11, as compared to the comparative example having no margin space 13.

The airflow analyzed via the simulation is now briefly described.

First, the airflow from the branch air inlet 10 in the comparative example (FIG. 18) is examined. The simulation shows that, in this comparative example that includes no margin space 13, flows F1' and G1' are generated. Specifically, the flow F1' passes through the connection opening 12c to reach the curved portion 12b, and the flow G1' flows downstream of the flow F1' along the straight portion 12a in the tangential direction of the circular inlet of the cyclone separator 11.

On the other hand, in this embodiment (FIG. 17) that has the margin space 13, in addition to flows F1 and G1 which are similar to the flows F1' and G1' of the comparative example, flows F2 and G2 occur. The flow F2 passes through the connection opening 12c to reach the curved portion 12b, flows toward the margin space 13, and then, helically loops in the straight portion 12a toward the cyclone separator 11. The flow G2 flows downstream of the flow F2 along the straight portion 12a in the tangential direction of the circular inlet of the cyclone separator 11.

The results of the simulation confirm that the occurrence of the flow F2 leads to the generation of a stronger swirl flow which starts at the flow F2. This stronger swirl flow improves the ability to separate particles by centrifugation and significantly reduces the entry of particles into the variation absorbing space 21.

Other Embodiments

This embodiment may be configured as follows.

In the above embodiment, the portable working machine is configured as the engine cutter 1. This is, however, merely an example. The working machine may be configured as a hedge trimmer for trimming hedges and the like, or a cleaning blower for blowing away dead leaves for example. Since these devices are also used in working areas (e.g., a road) having a large amount of dust particles deposited thereon or, for targets (e.g., trees and plants) having a large amount of dust particles (e.g., sand) attached thereto, the application of the present invention provides advantages.

In the above embodiment, the introduction through-hole 17 is formed near the outlet portion 2b for the cooling airflow from the cylinder fins of the cylinder portion 2a. The present invention, however, is not limited to this configuration. The ejector effect is obtainable as long as the introduction through-hole is positioned at a point where the cooling airflow runs at a high speed (i.e., a point near the heat-generating portions). For example, if the working machine has a configuration in which the muffler 2c of the engine 2, which is a component that frequently generates heat, is cooled with cooling airflow supplied through the centrifugal fan 7, the introduction through-hole is suitably formed in a passage which is near the muffler 2c and through which the cooling airflow passes. In such a case where the introduction through-hole is formed near the muffler 2c, the working machine may have a different configuration. For example, besides the configuration shown in FIG. 3, in which the cooling airflow comes outside the working machine from the left side shown in the figure (i.e., the right side of the working machine), a configuration is conceivable in which the cooling airflow is allowed to hit on an upper portion of the muffler 2c, and then, to flow out from the front side of the working machine (i.e., the left side of FIG. 4). The introduction through-hole is suitably formed at the respective position where the cooling airflow runs.

The above embodiments are merely preferred examples in nature, and are not intended to limit the scope, applications, and use of the present invention.

What is claimed is:

1. A portable working machine provided with an engine as a power source, the working machine comprising:
 a centrifugal fan which is driven by the engine and which sucks and transfers air;
 a main passage which is provided in a housing space where the centrifugal fan is housed, and through which a cooling airflow containing dust particles that have been pressed, by the centrifugal fan, against an inner peripheral surface of a wall defining the housing space is transferred;
 a branch air inlet which is provided at a position displaced from the main passage, and through which air containing less dust particles than the airflow passing through the main passage is transferred toward an air filter;
 a cyclone separator which is provided upstream of the air filter and has a circular cross section; and
 an introduction passage which extends from the branch air inlet to the cyclone separator,
 wherein:
  a margin space where at least part of the air introduced in the introduction passage flows is formed in the introduction passage before the cyclone separator, and
  the working machine is configured such that a swirl flow occurring in the cyclone separator starts at the margin space.

2. The portable working machine of claim 1, wherein the margin space is provided in a passage extending from the introduction passage to the cyclone separator, and formed by making an associated portion of a wall defining the passage protrude opposite to an inlet of the cyclone separator in an axial direction of the cyclone separator.

3. The portable working machine of claim 1, wherein the introduction passage has a straight portion which extends in a tangential direction of the cyclone separator as viewed in an axial direction of the cyclone separator and which continues to the cyclone separator, and a curved portion which extends in an arc and continues to the straight portion.

4. The portable working machine of claim 1, wherein
 the cyclone separator is arranged above the centrifugal fan and extends in an axial direction of a rotating shaft of the centrifugal fan, and
 when viewed in the axial direction, the introduction passage extends in a direction which forms an acute angle with a tangential direction of an inlet of the cyclone separator.

5. A portable working machine provided with an engine as a power source, the working machine comprising:
 a centrifugal fan which is driven by the engine and which sucks and transfers air;
 a main passage which is provided in a housing space where the centrifugal fan is housed, and through which a cooling airflow containing dust particles that have been pressed, by the centrifugal fan, against an inner peripheral surface of a wall defining the housing space is transferred;
 a branch air inlet which is provided at a position displaced from the main passage, and through which air containing less dust particles than the airflow passing through the main passage is transferred toward an air filter;
 a cyclone separator which is provided upstream of the air filter and has a circular cross section; and
 an introduction passage which extends from the branch air inlet to the cyclone separator,
 wherein an outlet-side cylindrical portion which has a smaller inside diameter than the cyclone separator is provided before an outlet of the cyclone separator.

6. The portable working machine of claim 5, wherein:

an introduction through-hole communicating with a passage, via which the cooling airflow from the centrifugal fan flows and which passes through a heat-generating portion of the engine, is formed at a point located radially outward relative to the outlet-side cylindrical portion, and at least part of air which has been pressed against a cyclone inner peripheral surface of the cyclone separator is introduced, through the introduction through-hole, into the passage that passes through the heat-generating portion of the engine.

7. The portable working machine of claim 5, wherein:

the air filter is provided in an upper portion of the portable working machine, and a space extending from an outlet of the outlet-side cylindrical portion toward the air filter is configured as a variation absorbing space which absorbs variation in a flow speed and a pressure in the space.

8. The portable working machine of claim 7, wherein in a side view, an inlet of the air filter is positioned above the outlet of the cyclone separator.

9. The portable working machine of claim 8, wherein:

the air filter has a pillar shape, and is covered with a tubular filter cover, and at least a portion of a bottom surface defining the variation absorbing space is inclined downwardly from a lower end portion of the filter cover toward a rear of the portable working machine.

10. The portable working machine of claim 5, wherein a guide portion of which an end is oriented opposite to the air filter is formed in a space extending from an outlet of the outlet-side cylindrical portion toward the air filter.

11. The portable working machine of claim 10, wherein the end of the guide portion is curved in a circular arc shape which extends along an inner surface of the cyclone separator.

12. The portable working machine of claim 10, wherein the cyclone separator is arranged in an upper portion of a body casing of the portable working machine such that the cyclone separator extends in a width direction of the portable working machine.

* * * * *